United States Patent [19]

Rothenberg et al.

[11] Patent Number: 4,769,247
[45] Date of Patent: Sep. 6, 1988

[54] METHOD FOR ADHERING SPICES ON THE SURFACE OF PASTA

[75] Inventors: Joan R. Rothenberg, East Windsor; Hector V. Ramos, Cranbury; Kenneth W. Fagan, Jr., Mt. Holly; David L. Smith, Trenton; Gary F. Greenwald, Hamilton Square, all of N.J.

[73] Assignee: General Foods Corporation, White Plains, N.Y.

[21] Appl. No.: 915,170

[22] Filed: Oct. 3, 1986

[51] Int. Cl.⁴ .......................... A23L 1/16; A23L 1/162
[52] U.S. Cl. ................................. 426/291; 426/250; 426/292; 426/293; 426/94
[58] Field of Search ................ 426/94, 96, 99, 291, 426/292, 293, 250

[56] References Cited

U.S. PATENT DOCUMENTS 3,652,299  3/1972  Penton ............................ 426/99

Primary Examiner—Donald E. Czaja
Assistant Examiner—Mary S. Mims
Attorney, Agent, or Firm—Sam D. Walker; Thomas R. Savoie; Daniel J. Donovan

[57] ABSTRACT

The present invention is concerned with a continuous process for preparing a non-segregating, free-flowing dried instant pasta and sauce dish comprising preheating pasta followed by conveying the pre-heated pasta to a rotating coating reel then applying a first layer of melted fat to the pasta into the rotating coating reel and contacting the fat coated pasta with dry ingredients then applying a second and third layer of fat to the spice coated pasta and finally adding vegetable inlays to the fat coated pasta and cool for packaging.

12 Claims, 1 Drawing Sheet

EXCESS FREE SPICE
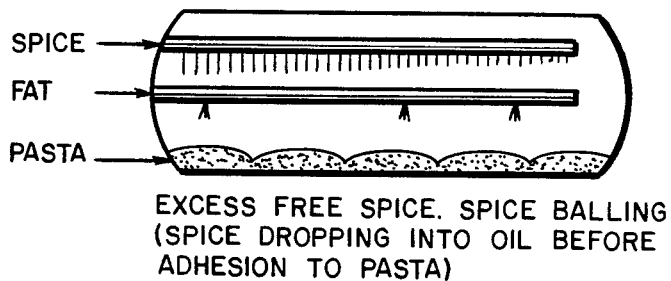
EXCESS FREE SPICE. SPICE BALLING
(SPICE DROPPING INTO OIL BEFORE
ADHESION TO PASTA)
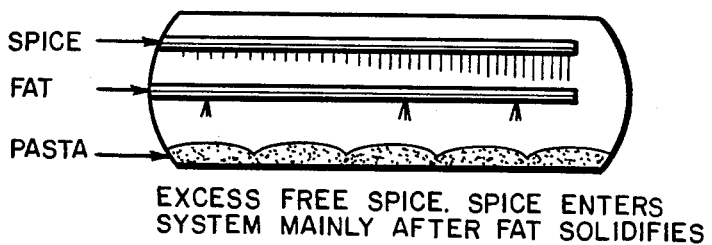
EXCESS FREE SPICE. SPICE ENTERS
SYSTEM MAINLY AFTER FAT SOLIDIFIES
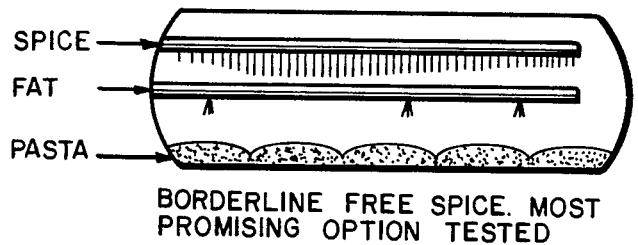
BORDERLINE FREE SPICE. MOST
PROMISING OPTION TESTED

METHOD FOR ADHERING SPICES ON THE SURFACE OF PASTA

FIELD OF THE INVENTION

The present invention is concerned with an improved process for producing an instant pasta and sauce dish. More particularly, the present invention is concerned with a process for adhering a spice/sauce blend to the surface of dried pasta so that a sauce will form upon cooking with water and the packaged product will have portion-controlled features.

BACKGROUND OF THE INVENTION

Food processors desire to package their food products in a manner compatable with the broadest range of consumer needs. Consumers, on the other hand, require the freedom to choose their own serving size. Consequently, foodstuffs are packaged to optimize the consumer's choice of serving sizes whenever practical. However, free-flowing mixtures of different size and density particles segregate after packaging, thereby restricting the feasible serving sizes to one: the entire package. Generally, the art has corrected this problem by agglomerating the segregating mixture to produce a nonsegregating mixture.

In the past, foods have been agglomerated by a variety of methods, including: steaming and contacting the moistened food particles; moistening and pressing the food partciles together, U.S. Pat. No. 518,891 issued to Manwaring; and blending a solid food or foods with an aqueous or an aqueous miscible fluid, U.S. Pat. No. 3,100,909 issued to Schapiro. However, the structure of some foodstuffs, e.g., bread crumbs, collapses at intermediate and high moistures when agitated, thus precluding the use of agglomeration methods wherein the foodstuff is moistened to these levels. Consequently, Hege, U.S. Pat. No. 3,987,138, developed a low moisture method of agglomeration. Hege teaches the use of a small amount of water dispered in a large volume of a nonmiscible, inert, liquid carrier to lightly moisten the food. However, this procedure, may leave an unacceptable residue of the nonmiscible, inert, liquid carrier in the food.

Block et al., U.S. Pat. No. 3,409,442, teaches a procedure that produces a single particle by aggregating dry ingredients with a foamed, edible binder. According to the Block et al. disclosure, the foam and not the dry ingredients, provides the agglomerated particle with its structure. Furthermore, the Block et al. teaching directs the production of a perceptually moist product. Consequently, Block et al. disclose that the foaming agent should constitute only about 2% of the foam and that the foam overrun is limited to between 150 to 250%. In the Block et al. process, the foam moistens, agglomerates, and provides the framework for the dry ingredients.

U.S. Pat. No. 4,476,145 by Hardie-Muncy et al. discloses a means for agglomerating food material whose structure is moisture sensative and colapses upon exposure to the moisture levels used in traditional agglomeration methods. This is accomplished in Hardie Muncy by dissolving a hydrophylic binding agent in water and whipping to form a high overrun foam. The foam is then coated on to the moisture sensitive material followed by the addition of the other ingredients. Further, U.S. Pat. No. 4,530,848 by Bannon et al. accomplishes the same end by coating oil onto the surface of a moisture sensative material such as specifically sized bread crumbs then distributing a powdered seasoning over the oil coated crumbs. The oil causes the powdered seasoning to aggregate on the surface of the bread crumbs. The resulting product can be prepared in a single hydration step, and any desired serving size can be easily prepared from a bulk packaged product.

It is, therefore, an objective of the present invention to prepare a portion-controlled, dry pasta product.

A further objective of the present invention is a process for agglomerating dry pasta and other food materials.

Another objective of the present invention is a process for preparing a non-segregating, free-flowing dehydrated pasta product.

SUMMARY OF THE INVENTION

The present invention is concerned with a process for preparing a non-segregating, free-flowing dried instant pasta and sauce dish comprising the steps of: heating pasta to temperatures ranging from 100° F. to 140° F. followed by tumbling the pasta in a coating reel rotating at from 4 to 7 revolutions per minute, then coating the heated tumbling pasta with melted fat and contacting the fat coated pasta with dry ingredients followed by mixing the fat coated pasta and dry ingredients for a time period ranging from 1 to 3 minutes until the fat coated pasta is covered in its entirety with the dry ingredient, then applying a second and third layer of fat sequentially over the pasta coated with dry ingredients and subsequently cooling same to temperatures ranging from 110° F. to 90° F. for packaging.

DETAILED DESCRIPTION

The present invention is concerned with a process for preparing a non-segregating, free-flowing dried instant pasta and sauce dish. This is accomplished by aggregating a variety of food materials on the surface on dry pasta where, upon hydration a pasta and sauce product is formed.

In the present invention pasta is heated to temperatures ranging from 100° to 140° F. Heating the pasta serves the purpose of enhancing suspending the dry ingredients into the fat. The heated pasta is then fed to a rotating coating reel at a flow rate of 600 to 1000 lbs./hr. It is preferred in the present invention that the coating reel rotates at from about 4 to about 7 revolution per minute. Rotation enhances even distribution of the coating and further prevents the particles from sticking together. Within the coating reel, the heated pasta is tumbling while the other ingredients are added.

The heated tumbling pasta is then sprayed with melted fat at a level ranging from 5 to 16% by weight of the pasta. Typically, the fat will be sprayed through a plurality of nozzles or a single nozzle in the case of a non-continuous process so that an essentially uniform fat coating is achieved throughout the surface of the pasta. In the case of a continuous process, spray nozzles are spaced in a specific configuration along the length of the coating reel said coating reel being positioned at an angle of from 10° to 30° from the horizontal to allow for continuous passage of the pasta. A first pair of nozzles is positioned close to the inlet of the coating reel to provide a first coat of fat about the pasta. A second pair of nozzles is positioned at a distance of at least ⅔ of the length of the coating reel measured from the inlet end. A third and final pair of nozzles is positioned at a distance of at least ¾ of the length of the coating reel measured from the inlet. This configuration allows for a dead zone between the first and second nozzles for the purpose of the addition of the dry ingredients (spice mix and other powdered materials).

The dry ingredients utilized in the present invention can vary depending on the desired end product. In the present invention, however, the dry ingredients may be a member selected from a group comprising salt, sugar, spices, flavoring materials, coloring materials and the like and combinations thereof. Said dry ingredients are then contacted with the fat coated pasta in a manner which will effect uniform distribution of the dry ingredients onto the surface of the fat coated pasta. The amount of dry ingredients added may vary over wide ranges, but will typically be between 12 and 18% by weight of the pasta (uncoated).

During the addition of the dry ingredients, continuous agitation is necessary to ensure that the fat coated pasta is covered in its entirety. In the continous process sufficient time is allowed for mixing after the dry ingredients are added. This is generally controlled by the angle or tilt of the coating reel which is designed to enhance passage of the product through the coating reel. In the non-continuous process, however, the fat coated pasta and dry ingredients are mixed for a period of time ranging from 1 to 3 minutes until the fat coated pasta is covered in its entirety with dry ingredients.

Once the pasta becomes coated in its entirety by the dry ingredients, the pasta is once again coated with a second layer of fat. This is accomplished by a second pair of spray nozzles in the case of the continous process and the single nozzle in the case of the non-continous process. Mixing is also essential in this second coating step to ensure a uniform fat coat. The purpose of a second fat coat is to ensure a good coating. This results in a layer of fat totally surrounding the uniform dry ingredients coated pasta, preventing said dry ingredients from falling off the pasta in subsequent processing. The amount of melted fat coated onto the pasta in the second coating step ranges from 5% to 6% by weight of the pasta (uncoated).

A third layer of fat is coated over the second layer to further assure that the vegetable inlays substantially adhere to the pasta. This is accomplished by a third pair of spray nozzles in the continuous process and the single nozzle in the non-continuous process. The amount of melted fat coated onto the pasta in the third coating step ranges from 5% to 6% by weight of the pasta (uncoated).

After the third layer of fat is evenly applied throughout the surface of the pasta, vegetable inlays are added to the tumbling mixer. This is accomplished in the continuous process by way of a long vibratory pan which is inserted after the third spray nozzle about 1.5 feet from the outlet end of the reel. In the non-continuous process, however, the vegetable inlay is applied by gradual sprinkling into the tumbling mixer.

The vegetable inlays will preferably have a particle size and density comparable to that of the pasta. Suitable cutting and sizing techniques will be employed so that essentially all of the vegetable pieces have a maximum dimension of between about ⅜ to 3/16×¾. In this manner the vegetable pieces and pasta will be less likely to segregate either during handling, packaging or distribution of the packaged product. The vegetable pieces will typically be added at a level ranging from 0.01% to 2.00% by weight of the pasta. Diced and dried celery, carrots, onions and the like may be included depending on the desired final product.

Since the product of the present invention is designed to be prepared by the consumer in a single step (i.e., single hydration step), the dried vegetables must be hydrated at essentially the same rate as the fat coated pasta/dry ingredients' aggregate. As will be appreciated by those skilled in the art, both the fat coating and the adhered dry ingredients will tend to retard hydration of the pasta; however, it will still be necessary to employ dried vegetable pieces which hydrates faster then conventional air dried vegetables. Freeze-dried vegetables and/or puffed dried vegetables will be suitable for use in this invention.

The vegetable inlay may be a member selected from the group comprising parsley, onions, mushrooms, carrots, red bell peppers, green bell peppers and the like and combination thereof. The specific vegetable inlays or combinations selected are dependent on the desired final product.

The fat utilized in the present invention is first melted, then pumped from a jacketed holding tank at a temperature above 120° F. and preferably from about 130° F. to about 150° F. and at a pressure from about 10 to 30 psig. A pressure drop of about 40–100 psig is developed across each nozzle. Air having pressures ranging from 10 to 20 psig is used to create an atomized hollow cone spray pattern of about 5 to 10 inches in diameter. The air used in the atomization is passed through a heat exchanger which heats it to a temperature ranging from about 120° F. to about 160° F.

The resultant reel environment due to the temperature of the pasta, fat and heated air ranges from about 110° F. to about 130° F. at the inlet and about 100° F. to about 110° F. at the outlet. This creates conditions such that when the dry ingredients are added they suspend into the fat coating on the pasta and remains there until the product is cooked. The nozzles at the time of spraying must be pointed to ensure that the atomized melted fat is sprayed onto the tumbling product.

The fat used in the present invention is a high melting point hydrogenated fat. It is preferred that a fat having a melting point above room temperature be utilized.

The dry ingredients of the present invention is fed from a loss-in-weight auger feeder to a 10 feet auger feeder which is located inside the coating reel next to the spraying system. This dry ingredients are fed to the tumbling pasta only between the first fat inlet and the second fat inlet.

The finished product is fed from the reel onto a belt conveyer which will carry said product to a cooling belt. This cooling belt provides cool air at about 40° to 65° F. to the finished pasta product. The pasta is cooled to temperatures ranging from 110° F. and 90° F. The product is then collected at the end of the reel and put in drums to be shipped to the packaging operations.

In the continuous process which is the preferred embodiment of the present invention, the configuration of the coating reel is critical. The following drawings illustrate the effect of different configurations inside the coating reel on the quality of the final product, particularly in the addition of dry ingredients.

The following example will further illustrate the features of the present invention.

EXAMPLE I

Alfredo Pasta Process Description

A flow rate of 667.3 lb/hr of preheated flat noodles was fed to a coating reel which was roating at about 6 RPM and positioned at an angle of 25° from the horizontal. The pasta was preheated to about 130° inside a hopper then fed gravimentrically onto a belt feeder then to a vibratory pan which delivers the pasta into the reel. A bed of about 3 inches was allowed to form in the reel before melted fat was added. The fat was melted in a jacketed-holding tank, then applied to the pasta by way of a set of three two-fluid nozzles which are spread out in a specific configurations. The melted fat was sprayed onto the heated pasta through a first pair of spray nozzles at a flow rate of 171.4 lb/hr or 57.1 lb/hr/nozzles. The first pair of nozzles were positioned at about 2 feet from the inlet of the reel. The other 2 pair of nozzles were positioned at about 7 feet and 8 feet respectively, from the inlet of the reel. The melted fat was pumped from the jacketed-holding tank at a temperature of about 140° F. and a pressure of about 15 psig. About 15 psig of air pressure was used to create an atomized hollow cone spray pattern of about 8 inches in diameter. The air used in the atomization was passed through a heat exchanger which heated it to about 140° F.

The resultant reel environment temperature due to pasta, fat and air heating was about 120° F. at its inlet and 110° F. at its outlet. The nozzles were positioned to ensure that the atomized melted fat was sprayed onto the tumbling product.

The spice mix and other powdered material were fed from a loss-in-weight auger feeder to a 10 feet auger feeder at a rate of 160.2 lbs/hr. The spice mix was fed to the tumbling pasta only between 2 feet from the inlet and 3 feet from the outlet of the reel. The parsley was then added to the tumbling coated pasta at a rate of 1.1 lb/hr by way of a long vibratory pan which was inserted about 1.5 ft into the outlet end of the reel.

The finished product is fed from the reel onto a belt conveyor at a rate of 1000 lb/hr. The belt conveyor will carry the product to a cooling belt which provides cool air at about 45° F. to the finished product. The product is then collected and put in drums to be shipped to the packaging operations.

What is claimed is:

1. A continuous process for preparing a non-segregating, free-flowing dried instant pasta and sauce dish comprising the steps of:
   (a) preheating instant pasta to temperatures ranging from 100° F. to 140° F.;
   (b) conveying the preheated pasta to a coating reel rotating at 4 to 7 rpm at a rate of 600 to 1000 lbs/hr;
   (c) tumbling the preheated pasta within the coating reel;
   (d) applying melted fat to the heated tumbling pasta through a first pair of fluid nozzles located 1/5th of the length of the coating reel measured from the inlet in amounts ranging from 5% to 16% by weight of the pasta;
   (e) contacting the fat coated heated pasta with dry sauce producing ingredients in amounts ranging from 12% to 18% by weight of the pasta between the first pair of fluid nozzles and a second pair of fluid nozzles;
   (f) applying melted fat to the pasta coated with dry ingredients through the second pair of fluid nozzles located ⅔ of the length of the coating reel measured from the inlet in amounts ranging from 5 to 6% by weight of the pasta;
   (g) applying melted fat to the fat coated pasta of step (f) through a third pair of fluid nozzles located ¾ of the length of the coating reel measured from the inlet, in amounts ranging from 5 to 6% by weight of the pasta; and
   (h) cooling the fat coated pasta to temperatures ranging from 110° F. to 90° F. for packaging.

2. A process according to claim 1 wherein the dry ingredient is a member selected from a group consisting of salt, sugar, spices, flavoring materials coloring materials and combinations thereof.

3. A process according to claim 1 further comprising the addition of vegetables inlays after the third fat coating step and before the cooling step.

4. A process according to claim 3 wherein the vegetable is a member selected from a group consisting of parsley, onions, mushrooms, carrots, red bell peppers, green bell peppers and combinations thereof.

5. A process for preparing a non-segregating, free-flowing dried instant pasta and sauce dish comprising the steps of:
   (a) heating pasta to temperatures ranging from 100° F. to 140° F.;
   (b) tumbling the pasta in a coating reel rotating at from 4 to 7 revolutions per minute;
   (c) coating the heated tumbling pasta with melted fat in amounts sufficient to totally enrobe the pasta;
   (d) contacting the fat coated pasta with dry ingredients;
   (e) mixing the fat coated pasta and dry ingredients for a time period ranging from 1 to 3 minutes until the fat coated pasta is covered in its entirety with the dry ingredients;
   (f) applying a second coat of fat to the fat coated pasta covered with dry ingredients in amounts sufficient to totally enrobe the pasta;
   (g) applying a third layer of fat to the coated pasta of step (f) in amounts sufficient to totally enrobe the second layer of fat; and
   (h) cooling the fat coated pasta to temperatures ranging from 110° F. to 90° F. for packaging.

6. A process according to claim 5 further comprising the addition of vegetable inlays after the third fat coating step and before the cooling step.

7. A process according to claim 5 wherein the amount of fat coated onto the pasta in step (c) ranges from 5 to 16% by weight of the pasta.

8. A process according to claim 5 wherein the amount of dry ingredients contacted with the pasta ranges from 12% to 18% by weight of the pasta.

9. A process according to claim 5 wherein the amount of fat coated onto the pasta in step (f) ranges from 5% to 6% by weight of the pasta.

10. A process according to claim 5 wherein the amount of fat coated onto the pasta of step (g) ranges from 5% to 6% by weight of the pasta.

11. A process according to claim 5 wherein the dry ingredients is a member selected from a group consisting of salt, sugar, spices, flavoring materials, coloring materials and combinations thereof.

12. A process according to claim 6 wherein the vegetable inlays is a member selected from a group consisting of parsley, onions, mushrooms, carrots, red bell peppers, green bell peppers and combinations thereof.

* * * * *